United States Patent [19]

Bukkems et al.

[11] Patent Number: 4,497,605
[45] Date of Patent: Feb. 5, 1985

[54] CENTRIFUGAL PUMP FOR TRANSFERRING SOLID PARTICLES FROM A LOW PRESSURE ZONE INTO A HIGH PRESSURE ZONE

[75] Inventors: Franciscus H. J. Bukkems; Bernardus B. Quist, both of Amsterdam, Netherlands

[73] Assignee: Shell Oil Company, Houston, Tex.

[21] Appl. No.: 463,707

[22] Filed: Feb. 4, 1983

[30] Foreign Application Priority Data

Jun. 30, 1982 [GB] United Kingdom ................. 8218858

[51] Int. Cl.³ .............................................. B65G 33/20
[52] U.S. Cl. ................................... 414/218; 414/217; 222/413; 406/56; 406/71
[58] Field of Search ....................... 414/217, 218, 301; 222/413; 406/53, 56, 61, 71

[56] References Cited

U.S. PATENT DOCUMENTS

| | | | |
|---|---|---|---|
| 1,954,005 | 4/1934 | Westberg et al. | 406/56 X |
| 2,032,337 | 2/1936 | Vogel-Jorgensen | 406/53 |
| 2,865,519 | 12/1958 | Wessollek | 414/218 |
| 3,841,465 | 10/1974 | Miller, Jr. et al. | 414/218 X |
| 4,120,410 | 10/1978 | van der Burgt | 414/301 |
| 4,197,092 | 4/1980 | Bretz | 414/217 X |

Primary Examiner—Leslie J. Paperner
Assistant Examiner—Ken Muncy

[57] ABSTRACT

A centrifugal pump for transferring solid particles from a low pressure zone into a high pressure zone comprises a centrifugal rotor and a housing that are each rotatable about a central axis. The rotor debouches particles into the interior of the housing and a screw conveyor is arranged in the housing for transporting particles along the inner surface of the housing to an outlet which is coaxial to the central axis.

8 Claims, 2 Drawing Figures

CENTRIFUGAL PUMP FOR TRANSFERRING SOLID PARTICLES FROM A LOW PRESSURE ZONE INTO A HIGH PRESSURE ZONE

BACKGROUND OF THE INVENTION

The invention relates to a centrifugal pump for transferring solid particles from a low pressure zone into a high pressure zone, such as a centrifugal pump for supplying coal powder into a high pressure coal gasification reactor.

When supplying coal powder into a high pressure coal gasification reactor, the gas pressure in the reactor has to be overcome, which pressure is usually at least 10 atm. absolute during normal operation. It is known in the art to use for this purpose a centrifugal coal pump. During operation of such pump, the rotor thereof rotates at high rotational speed and coal particles are ejected by centrifugal force from the rotor into a gas-pressurized pump housing and subsequently the particles leave the housing via an outlet that is in communication with the gasification reactor. A disadvantage of these known pumps is the high abrasion of the inner surface of the housing and the coal particles as the particles scour at high speed over the inner surface of the housing. Examples of such centrifugal pumps are contained in U.S. patents such as U.S. Pat. Nos. 3,182,825; 4,049,133; 4,120,410 and 4,360,306.

SUMMARY OF THE INVENTION

The object of the invention is to provide a centrifugal pump for transferring solid particles from a low pressure zone into a high pressure zone wherein abrasion of the housing during operation is extremely low.

The centrifugal pump according to the invention comprises thereto an inlet and an outlet that are coaxial to a central axis, a centrifugal rotor and a housing, that are rotatable about the central axis, the rotor debouching into the interior of the housing and transport means arranged in the housing for transporting particles over the inner surface of the housing to the outlet.

In a suitable embodiment of the invention the transport means consists of a screw conveyor cooperating with a frusto conical section of the housing and being rotatable about the central axis relative to the housing.

In another suitable embodiment of the invention the pump comprises liquid supply means for supplying liquid into the housing so as to create during operation an annular centrifugal liquid seal in the housing at the circumference of the rotor. The sealing liquid may consist of a liquid of low density and of low viscosity such as water or a suitable hydrocarbon.

BRIEF DESCRIPTION OF THE DRAWING

The assembly and operation of some embodiments of the invention will be described by way of example and in more detail with reference to the accompanying drawings, wherein.

DESCRIPTION OF THE INVENTION

Figure 1:
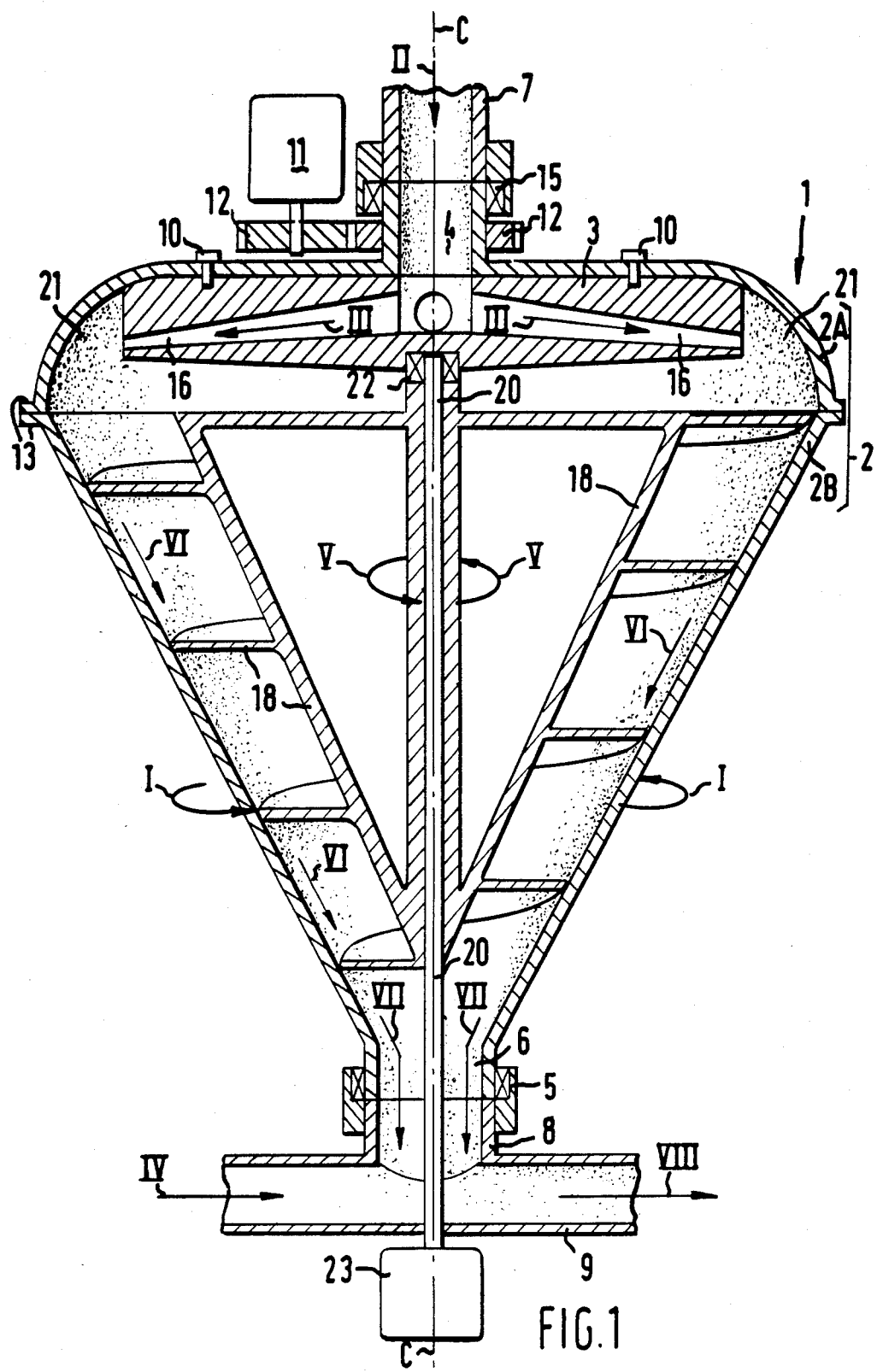
FIG. 1 shows a vertical cross-sectional view of a pump according to the invention.

In FIG. 1 the centrifugal pump for transferring solid particles from a low pressure zone into a high pressure zone is indicated by the reference numeral 1. The pump 1 comprises a housing 2 that is rotatable about a central axis C. The housing 2 is rotatably supported by bearings 5 and 15, that are arranged coaxially to the central axis C. The housing 2 is connected to a drive motor 11 via a pair of gearing wheels 12. At the upper end of the housing 2 an inlet 4 is arranged coaxially to the axis C and at the lower end of the housing 2 an outlet 6 is arranged coaxially to the axis C. The outlet 6 provides a communication between the interior of the housing 2 and a discharge tube 8 that debouches into a flow line 9. The inlet 4 provides a communication between a supply tube 7 and the entrance of each of four radial passages 16 of a centrifugal rotor 3. The centrifugal rotor 3 is arranged in the housing 2 and each rotor passage 16 debouches into the interior of the housing 2. The rotor 3 is connected to the housing 2 by a series of bolts 10, so that the housing 2 and the rotor 3 form a single rotatable unit 2 and 3. The housing 2 consists of an upper housing section 2A and of a lower housing section 2B, the sections 2A and 2B being secured to each other by means of flanges 13, that are clamped together by nuts and bolts (not shown).

The lower housing section 2B is of a frusto-conical shape and a screw conveyor 18 is provided for cooperation with the inner surface of the lower housing section 2B. The screw conveyor 18 is mounted on a shaft 20 that is coaxial to the central axis C. The shaft 20 is at the upper end thereof rotatably supported by a bearing 22 which is carried by the rotor 3. The shaft 20 passes through the wall of the flow line 9 and the lower end of the shaft is connected to a drive motor 23 of a suitable type, such as an electro-motor or a hydraulic motor.

The operation of the pump 1 of FIG. 1 will now be explained. During operation the housing 2 and the rotor 3 are driven by the drive motor 11 to rotate about axis C in an anti-clockwise direction (seen from above) as indicated by arrows I. Solid particles are supplied from low pressure storage facilities (not shown) via the supply tube 7 to the inlet 4 (see arrow II). These particles pass under influence of gravity force via the inlet 4 into the rotor passages 16. Subsequently the particles are ejected under influence of centrifugal force from the rotor passages 16 (see arrows III) into the housing 2. The particles after having left the passages 16 form an annular packed bed 21 against the inner surface of the housing 2 in such a way that the annular packed bed 21 surrounds the rotor 3. The interior of the housing is pressurized by pressurized gas that is supplied from a source (not shown) via the flow line 9 (see arrow IV). A sealing between the pressurized interior and the low pressure inlet 4 is provided by the annular packed bed 21 and by the flow of packed solid particles passing through the rotor passages 16.

The screw conveyor 18 is driven by the drive motor 23 to rotate about axis C in an anti-clockwise direction (seen from above) as indicated by arrows V. The speed of rotation V of the screw conveyor 18 is chosen slightly lower than the speed of rotation I of the housing 2, so that the screw conveyor 18 rotates relative to the housing 2 with a small rotational speed in a clockwise direction (seen from above). As a result thereof the screw conveyor 18 transports solid particles from the packed bed 21 over the inner surface of the housing 2 to the outlet 6 (see arrows VI). Subsequently, the particles pass through the outlet 6 and through the discharge tube 8 (see arrows VII) into the flow line 9. Finally, the particles are mixed with the pressurized transport gas passing through the flow line and transported by the gas flow (see arrow VIII) through the flow line 9 to a high pressure vessel (not shown).

It will be appreciated that the speed of the solid particles over the inner surface of the housing 2 may be chosen low, and that the radial velocity of particles leaving the passages 16 of the rotor 3 will be diminished quickly in the annular packed bed 21 of particles that surround the rotor 3. As a result thereof, abrasion of the inner surface of the housing 2 during operation of the pump 1 will be extremely low.

It will be understood that if desired the housing 2 and the screw conveyor 18 may be driven by a single drive motor (not shown) to rotate during operation at mutual different rotational speeds by arranging a planetary gearing (not shown) between the housing 2 and the screw conveyor 18.

Figure 2:
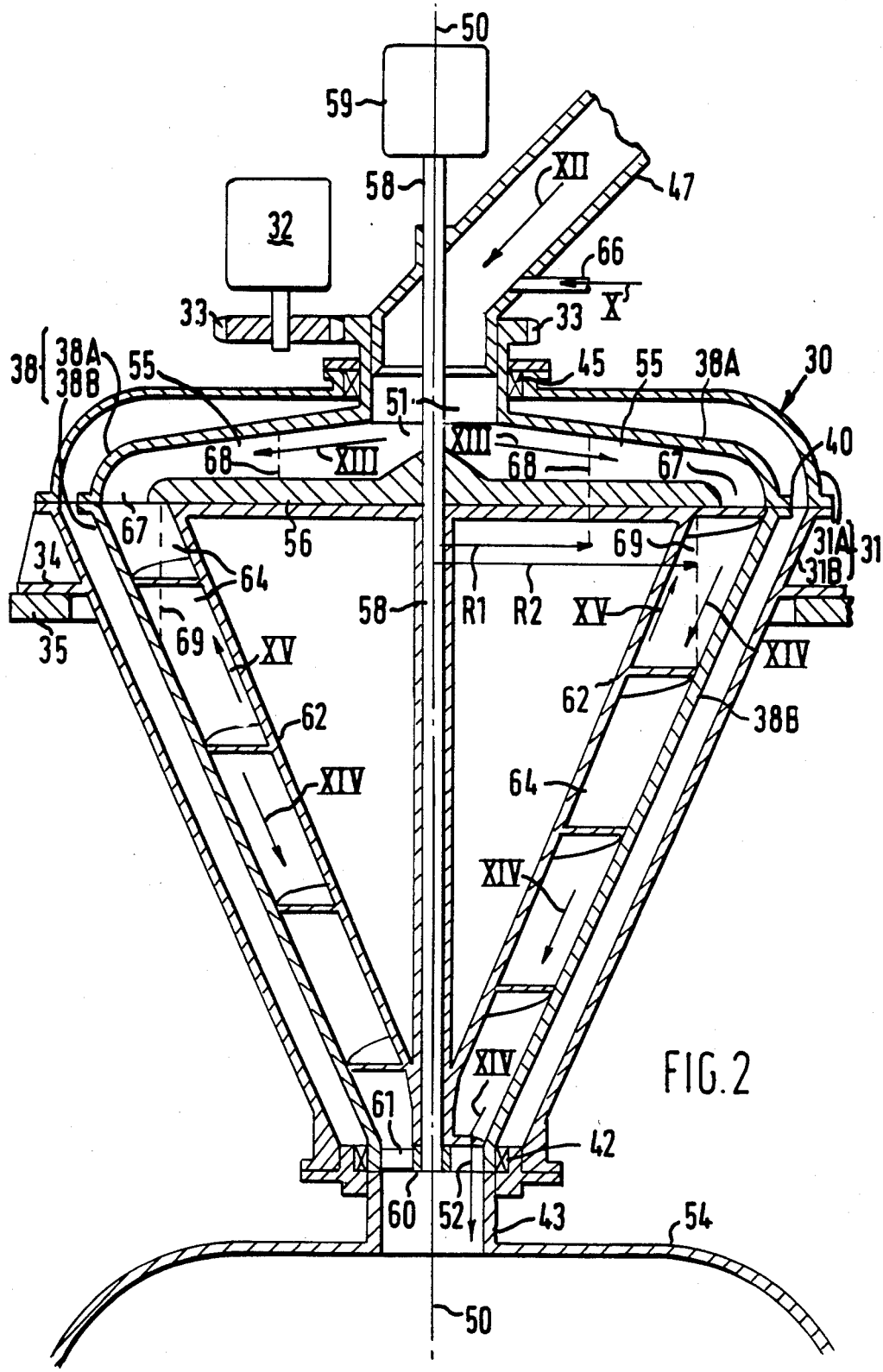
FIG. 2 shows a vertical cross-sectional view of another pump according to the invention.

FIG. 2 shows another pump according to the invention. The pump 30 comprises a pressure resistant shell 31 that is built up of an upper section 31A and of a lower section 31B that is supported on a frame 35 by means of a support ring 34. The shell 31 surrounds a rotatable housing 38 that is connected to a drive motor 32 via a pair of gearing wheels 33. The housing 38 consists of an upper housing section 38A and of a lower housing section 38B, the housing sections 38A and 38B being secured to each other by means of flanges 40, that are clamped together by nuts and bolts (not shown). The housing 38 is rotatably supported by bearings 42 and 45, that are carried by the shell 31. The bearing 42 and the bearing 45 are arranged in such a way that the housing 38 is rotatable about a central axis 50. An inlet 51 and an outlet 52 are arranged coaxially to the central axis 50, the inlet 51 being located at the upper end of the housing 38 and the outlet 52 being located at the lower end of the housing 38. The outlet 52 provides a communication between the interior of the housing 38 and a discharge tube 43, which tube 43 debouches into a high pressure vessel 54 such as a high pressure storage vessel or a high pressure reactor vessel. The inlet 51 provides a communication between a supply tube 47 and a passage 55, that is defined between a disc-shaped rotor 56 and the upper housing section 38A. The rotor 56 and a screw conveyor 62 are mounted on a shaft 58 that is coaxial to the central axis 50. The shaft 58 is at the upper end thereof connected to a drive motor 59 and the shaft 58 is at the lower end thereof supported by a bearing 60. The bearing 60 is supported by the housing 38 by means of spokes 61 in the outlet 52. Furthermore, liquid supply means 66 for supplying liquid such as water or hydrocarbons to the interior of the housing 38 are in communication with the interior of the supply tube 47.

The operation of the pump 30 will now be explained. During operation the housing 38 is driven by the drive motor 32 to rotate at a predetermined rotational speed in an anti-clockwise direction (seen from above) about the central axis 50. The screw conveyor 62 and the rotor 56 are driven by the drive motor 59 to rotate about the axis 50 in the same direction as the housing 38, but at a rotational speed slightly lower than the rotational speed of the housing 38. Liquid is supplied (see arrow X) to the interior 64 of the rotating housing 39 via the liquid supply means 66, the inlet 51 and the passage 55, thereby forming an annular liquid seal 67 in the interior 64 of the housing 38 under influence of centrifugal force. The interior 64 of the housing 38 is gas-pressurized under influence of the gas pressure in the high pressure vessel 54 and the annular seal 67 separates the pressurized interior 64 from the low pressure inlet 51. The speed of rotation of the housing 38 is chosen such that at normal operation an equilibrium is achieved under influence of centrifugal force when the cylindrical liquid surface 69 in the interior 64 of the housing 38 is located at a radius R2 with respect to the axis 50 and the cylindrical liquid surface 68 in the passage 55 is located at a smaller radius R1.

Solid particles, such as coal powder, are passed via the supply tube 47 and the inlet 51 (see arrow XII) to the passage 55. Under influence of friction the particles are accelerated in the passage 55 to rotate together with the rotor. Subsequently, the particles are ejected (see arrows XIII) by centrifugal force from the passage 55 into the annular liquid seal 67. The density of the liquid of the seal 67 is chosen lower than the density of the solid particles and the solid particles will thus be driven by centrifugal force through the liquid seal 67 to the outer circumference of the rotor 56, thereby creating an annular packed bed of solid particles in the seal 67.

As the speed of rotation of the shaft 58, the rotor 56 and the screw conveyor 62 is chosen slightly lower than the rotational speed of the housing 38, they rotate relative to the housing 38 at a low speed of rotation in a clockwise direction (seen from above). This causes the screw conveyor 62 to transport a mixture of solid particles and liquid from the outer circumference of the rotor 56 over the inner surface of the housing 38 to the outlet 52 (see arrows XIV). As the density of the liquid is lower than the density of the solid particles, the liquid will at least for the greater part thereof be separated from the solid particles and return to the liquid seal 67 under influence of the centrifugal force (see arrows XV). The quantity of residual liquid that disappears through the outlet 52 by the mixture flow (see arrow XIV) is balanced by a controlled supply of liquid via the liquid supply means 66 (see arrow X), and the annular liquid seal 67 is thus kept intact during the transport process.

The mixture of solid particles and residual liquid is transported by the screw conveyor 62 over the inner surface of the housing 38 (see arrow XIV) to the outlet 52, and subsequently the said mixture is transferred under influence of gravity force via the discharge tube 43 to the high pressure vessel 54.

It will be appreciated that the velocity of the mixture flow XIV over the inner surface of the housing 38 may be chosen low and that the radial velocity of solid particles that are ejected from the passage 55 (see arrow XIII) is gradually diminished in the annular liquid layer 67 until the particles reach the annular packed bed of particles at the circumference of the rotor 56. As a consequence thereof abrasion of the inner surface of the housing 38 will be extremely low.

A particular advantage of the pump assembly of FIG. 2 is that the difference in rotational speed between the rotor 56 and the housing 38 considerably reduces the risk of blocking of the passage 55 by clogging of solid particles. The risk of blockage will also be reduced because of the much wider dimensions allowed for passage 55 in comparison with passages 16 (see FIG. 1).

It will be understood that various alternative types of centrifugal rotors may be applied, such as the centrifugal rotors known from the specifications of U.S. Pat. Nos. 4,120,410 and 4,049,133. Furthermore, it will be appreciated that the foregoing description of the invention is illustrative and that various changes in the shape and the assembly of the illustrated constructions may be made without departing from the spirit of the invention.

What is claimed is:

1. A centrifugal pump for transferring solid particles from a low pressure zone into a high pressure zone, said pump comprising:
   an inlet and an outlet that are coaxial to a central axis;
   a centrifugal rotor and a housing that are rotatable about the central axis;
   said rotor centrifugally debouching particles into the interior of the housing; and
   screw conveyor transport means arranged for rotation in the housing at a speed different from that of the housing for transporting particles over the inner surface of the housing to the outlet.

2. The pump of claim 1, wherein the inlet is arranged at one end of the housing and the outlet is arranged at another end of the housing.

3. The pump of claim 1, wherein the transport means consists of a screw conveyor arranged to cooperate with a frusto conical section of the housing and being rotatable about the central axis relative to the housing.

4. The pump of claim 1, wherein the centrifugal rotor is mounted on a shaft passing through the inlet and the outlet, the rotor and the shaft forming a single unit rotatable relative to the housing.

5. The pump of claim 4, wherein the screw conveyor is mounted on the shaft in such a way that the centrifugal rotor, the shaft and the screw conveyor form a single rotatable unit.

6. The pump of claim 1, wherein the centrifugal rotor is coupled to the housing in such a way that the rotor and the housing form a single rotatable unit.

7. The pump of claim 1, wherein the pump contains liquid supply means for supplying liquid to the housing, so as to create during operation an annular centrifugal liquid seal in the housing at the circumference of the rotor.

8. The pump of claim 1, wherein the housing is arranged in a pressure resistant shell.

* * * * *